(12) United States Patent
Langham et al.

(10) Patent No.: US 12,190,377 B2
(45) Date of Patent: Jan. 7, 2025

(54) SYSTEM AND METHOD FOR PROVIDING DATA ACCESS

(71) Applicant: The Toronto-Dominion Bank, Toronto (CA)

(72) Inventors: Steve Langham, London (CA); Miguel Navarro, Ewing, NJ (US); Elkin Ng Fung, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/576,596

(22) Filed: Jan. 14, 2022

(65) Prior Publication Data

US 2023/0230156 A1 Jul. 20, 2023

(51) Int. Cl.
*G06Q 40/04* (2012.01)
*G06F 21/44* (2013.01)
*H04L 9/32* (2006.01)

(52) U.S. Cl.
CPC ............ *G06Q 40/04* (2013.01); *G06F 21/44* (2013.01); *H04L 9/3213* (2013.01); *G06F 2221/2129* (2013.01)

(58) Field of Classification Search
CPC ...................................................... G06Q 40/04
See application file for complete search history.

(56) References Cited

U.S. PATENT DOCUMENTS

| | | |
|---|---|---|
| 8,521,637 B2 | 8/2013 | Brandes et al. |
| 11,030,326 B2 | 6/2021 | Coffing |
| 11,100,487 B2 | 8/2021 | Silverman |
| 2011/0179477 A1 | 7/2011 | Starnes et al. |
| 2018/0108087 A1 | 4/2018 | Sandor |
| 2018/0349898 A1 | 12/2018 | Ayikara Kizhakayil et al. |
| 2019/0050189 A1* | 2/2019 | Bongiovanni ........... G09G 5/00 |
| 2020/0250752 A1 | 8/2020 | Sugarman |
| 2020/0334752 A1 | 10/2020 | Doney et al. |

FOREIGN PATENT DOCUMENTS

| | | | | |
|---|---|---|---|---|
| CA | 2750302 | * | 2/2012 | ............. G06Q 40/04 |
| WO | 2020223332 A1 | | 11/2020 | |

OTHER PUBLICATIONS

Jarecki, et al., in "Two-factor Password-authenticated Key Exchange with End-to-End Security," in ACM (Year: 2021).*

* cited by examiner

*Primary Examiner* — Olabode Akintola
*Assistant Examiner* — Brandon M Duck
(74) *Attorney, Agent, or Firm* — BORDEN LADNER GERVAIS; Curtis Behmann

(57) ABSTRACT

Computing devices, platforms, methods, and storage media for providing data access are disclosed. Exemplary implementations may: obtain a device authorization token granting a computing device authenticated access to real-time equity quotes when the computing device is in an unauthenticated state; transmit, to a quote access server, an authorized quote access request specifying one or more equities for which one or more real-time equity quotes are requested; receive, from the quote access server, the one or more real-time equity quotes associated with the one or more equities; and provide, in the unauthenticated state, the one or more real-time equity quotes associated with the one or more equities. Example implementations make it simpler and easier to view real-time quotes, for example with a single swipe/gesture and without opening a financial institution app or logging in to a website hosted by a financial institution.

20 Claims, 5 Drawing Sheets

SYSTEM AND METHOD FOR PROVIDING DATA ACCESS

FIELD

The present disclosure relates to providing data access, including but not limited to computing platforms, methods, and storage media for processing a data access request.

BACKGROUND

Providing data access is useful in a number of different scenarios. In one example, a user may wish to access data, such as a quote relating to a particular equity.

Some known approaches on mobile devices, such as using iOS and Android, can provide a user with delayed equity quotes using a stock widget on a mobile device. However, those stock widgets are based on quotes that are delayed by about 15 minutes, and are typically pulled via an API from a free resource to access the quote data, as opposed to real-time quotes obtained after payment via API through brokers. Delayed quotes, such as those provided by existing stock widgets, can create volatility in the market.

To view real time equity quotes, a user, such as a banking or direct investing customer, is currently required to open or log in to a financial institution mobile app or website.

Improvements in approaches for providing data access are desirable.

SUMMARY

One aspect of the present disclosure relates to a computing platform configured for providing data access. The computing device may include a non-transient computer-readable storage medium having executable instructions embodied thereon. The computing device may include one or more hardware processors configured to execute the instructions. The processor(s) may execute the instructions to obtain a device authorization token granting the computing device authenticated access to real-time equity quotes when the computing device is in an unauthenticated state. The processor(s) may execute the instructions to transmit, to a quote access server, an authorized quote access request specifying one or more equities for which one or more real-time equity quotes are requested. The authorized quote access request may include data associated with the device authorization token. The processor(s) may execute the instructions to receive, from the quote access server, the one or more real-time equity quotes associated with the one or more equities. The processor(s) may execute the instructions to provide, in the unauthenticated state, the one or more real-time equity quotes associated with the one or more equities.

Another aspect of the present disclosure relates to a method for providing data access. The method may include obtaining a device authorization token granting a computing device authenticated access to real-time equity quotes when the computing device is in an unauthenticated state. The method may include transmitting, to a quote access server, an authorized quote access request specifying one or more equities for which one or more real-time equity quotes are requested. The authorized quote access request may include data associated with the device authorization token. The method may include receiving, from the quote access server, the one or more real-time equity quotes associated with the one or more equities. The method may include providing, in the unauthenticated state, the one or more real-time equity quotes associated with the one or more equities.

Yet another aspect of the present disclosure relates to a non-transient computer-readable storage medium having instructions embodied thereon, the instructions being executable by one or more processors to perform a method for providing data access. The method may include obtaining a device authorization token granting a computing device authenticated access to real-time equity quotes when the computing device is in an unauthenticated state. The method may include transmitting, to a quote access server, an authorized quote access request specifying one or more equities for which one or more real-time equity quotes are requested. The authorized quote access request may include data associated with the device authorization token. The method may include receiving, from the quote access server, the one or more real-time equity quotes associated with the one or more equities. The method may include providing, in the unauthenticated state, the one or more real-time equity quotes associated with the one or more equities.

BRIEF DESCRIPTION OF THE DRAWINGS

Embodiments of the present disclosure will now be described, by way of example only, with reference to the attached Figures.

DETAILED DESCRIPTION

Figure 1:
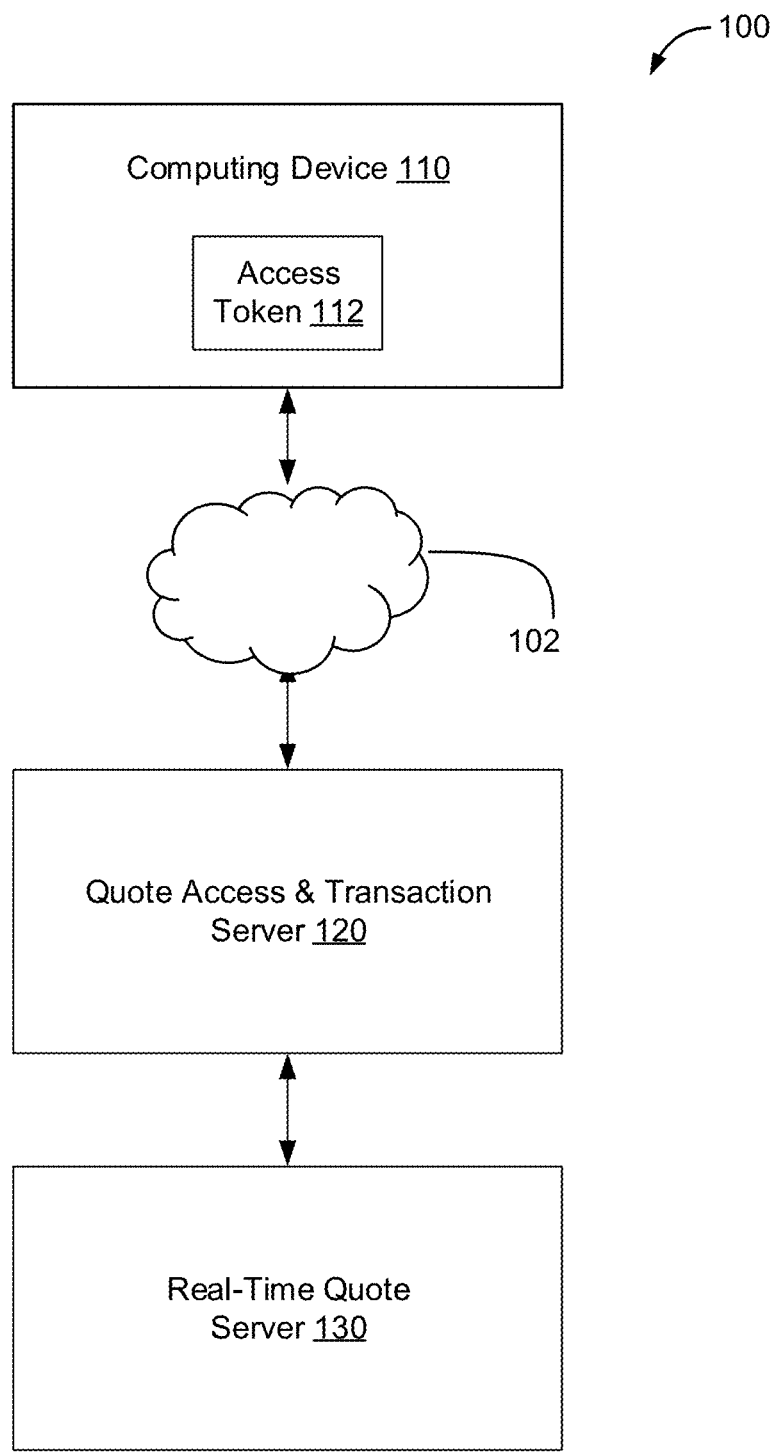
FIG. 1 illustrates a system configured for providing data access, in accordance with one or more embodiments.

Computing devices, computing platforms, methods, and storage media for providing data access are disclosed. Exemplary implementations may: obtain a device authorization token granting a computing device authenticated access to real-time equity quotes when the computing device is in an unauthenticated state; transmit, to a quote access server, an authorized quote access request specifying one or more equities for which one or more real-time equity quotes are requested; receive, from the quote access server, the one or more real-time equity quotes associated with the one or more equities; and provide, in the unauthenticated state, the one or more real-time equity quotes associated with the one or more equities.

In an embodiment, the present disclosure provides unauthenticated access to real-time equity quotes via a mobile device widget, then optionally deep links to authenticated access to a related equity transaction. Example embodiments of the present disclosure make it simpler and easier to view real-time quotes, for example with a single swipe/gesture and without opening a financial institution app or logging in to a website hosted by a financial institution.

In an example embodiment, a widget for a mobile device is configured to provide a user with unauthenticated access to real-time equity quotes, based on a user authorization to receive the quotes, and without requiring user authentication or opening a banking or investment app. The authorization may be based on an indication that the user is a customer, or that the user is a non-customer authorized to receive the real-time equity quotes. The widget may provide intelligent deep linking to enable the user to conduct a related equity transaction or trade, on the same mobile device or on another platform, based on one of the displayed real-time quotes.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

As used herein, "real-time" in the context of a "real-time equity quote" refers to an equity quote that is provided substantially in real-time, for example when compared to delayed equity quotes that are delayed about 15 minutes. For example, a real-time equity quote may be pulled from a quote server about every 10 seconds, or an updated quote may be pushed from the quote server when available, even if it is before a scheduled "pull". In another implementation, a real-time equity quote may be pulled about every 30 seconds, or about every minute, in contrast to the typical 15 minute delay that is associated with delayed equity quotes that are typically provided from a source at no cost. Real-time data helps to reduce volatility, to make smart decisions based on what is happening right now, or substantially in real time, not 15 minutes ago. In an embodiment, an institution, such as a financial institution, pays for access to real-time quotes through one or more trading brokers.

FIG. 1 illustrates a system 100 configured for providing data access, in accordance with one or more embodiments. As shown in FIG. 1, a computing device 110, such as a communication device or a mobile device, is in communication via a network 102 with a quote access and transaction server 120. In an example embodiment, the computing device 110 is associated with a user of the system or a customer of the system. In an example embodiment, the computing device 110 includes a processor and a memory storing statements and instructions for execution by the processor to run an application, such as a mobile device widget.

In an embodiment, a token, such as a device authorization token or an access token 112, is stored in a memory associated with the computing device 110. The access token 112, or device authorization token, may be configured to grant the computing device authenticated access to real-time equity quotes when the computing device is in an unauthenticated state. In an embodiment, the computing device is in an unauthenticated state when the computing device is not logged in to an application or website associated with providing authenticated data access, such as real-time equity quotes.

In an embodiment, the computing device 110 is configured to obtain the device authorization token based on an indication that the computing device is associated with a customer of an institution, or based on an indication that the computing device is associated with a non-customer authorized to receive the one or more real-time equity quotes from the institution. In an example embodiment, the non-customer authorization may be based on an agreement, a promotion, or a temporary benefit offered to the user.

In an example embodiment, the quote access and transaction server 120 is associated with an institution in relation to which the user associated with the computing device 110 has an account, or is otherwise authorized to obtain specific data access.

A real-time quote server 130 may be in communication with the quote access and transaction server 120 to provide real-time quotes to the computing device 110. In an example embodiment, the real-time quote server 130 is a broker server. The quote access and transaction server 120 may be configured to transmit, to the real-time quote server 130, an authorized quote access request specifying one or more equities for which one or more real-time equity quotes are requested. The authorized quote access request may include data associated with the device authorization token.

In an embodiment, the quote access and transaction server 120, and optionally the real-time quote server 130, are managed by, or under the control of, an institution, such as a financial institution. The institution may communicate with the quote access and transaction server 120, and optionally the real-time quote server 130, to manage access to real-time quote data for use by an application such as a mobile device widget.

In an embodiment, the computing device 110 is configured for providing data access, and comprises: a non-transient computer-readable storage medium having executable instructions embodied thereon; and one or more hardware processors configured to execute the instructions to: obtain a device authorization token 112 granting the computing device 110 authenticated access to real-time equity quotes when the computing device 110 is in an unauthenticated state; transmit, to a quote access server 120, an authorized quote access request specifying one or more equities for which one or more real-time equity quotes are requested, the authorized quote access request comprising data associated with the device authorization token 112; receive, from the quote access server 120, the one or more real-time equity quotes associated with the one or more equities; and provide, in the unauthenticated state, the one or more real-time equity quotes associated with the one or more equities.

In embodiment, the quote access server 120 is configured to receive the authorized quote access request from the computing device 110 specifying one or more equities for which one or more real-time equity quotes are requested. The authorized quote access request may comprise data associated with the device authorization token 112. In an embodiment, the quote access server 120 is configured to send or transmit the one or more real-time equity quotes associated with the one or more equities. In an embodiment, the real-time quote server 130 is configured to receive, from the quote access and transaction server 120, the authorized quote access request specifying one or more equities for which one or more real-time equity quotes are requested.

The real-time equity quote server 130 is configured to provide the real-time equity quotes requested in relation to the one or more equities.

Figure 2:
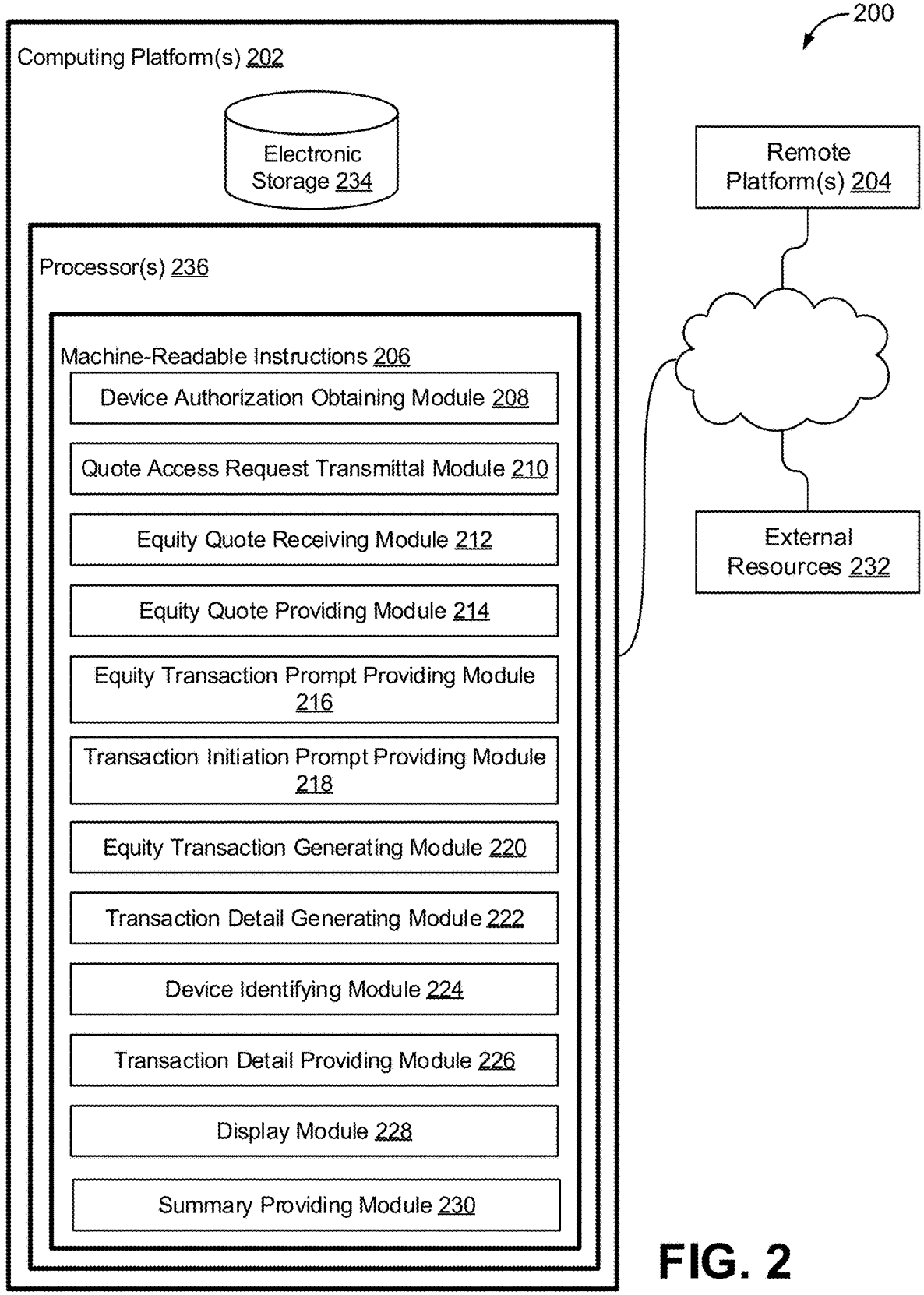
FIG. 2 illustrates another system configured for providing data access, in accordance with one or more embodiments.

FIG. 2 illustrates a system 200 configured for providing data access, in accordance with one or more embodiments. In some embodiments, system 200 may include one or more computing platforms 202. Computing platform(s) 202 may be computing device(s). Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of device authorization obtaining module 208, quote access request transmittal module 210, equity quote receiving module 212, equity quote providing module 214, equity transaction prompt providing module 216, transaction initiation prompt providing module 218, equity transaction generating module 220, transaction detail generating module 222, device identifying module 224, transaction detail providing module 226, display module 228, summary providing module 230, and/or other instruction modules.

Device authorization obtaining module 208 may be configured to obtain a device authorization token granting the computing device authenticated access to real-time equity quotes when the computing device is in an unauthenticated state.

Device authorization obtaining module 208 may be configured to obtain the device authorization token, for example based on an indication that the computing device is associated with a customer of an institution, or based on an indication that the computing device is associated with a non-customer authorized to receive the one or more real-time equity quotes from the institution.

Quote access request transmittal module 210 may be configured to transmit, to a quote access server, an authorized quote access request specifying one or more equities for which one or more real-time equity quotes are requested. The authorized quote access request may include data associated with the device authorization token.

Equity quote receiving module 212 may be configured to receive, from the quote access server, the one or more real-time equity quotes associated with the one or more equities.

Equity quote providing module 214 may be configured to provide, in the unauthenticated state, the one or more real-time equity quotes associated with the one or more equities.

Equity transaction prompt providing module 216 may be configured to provide an equity transaction prompt. Equity transaction prompt providing module 216 may be configured to provide the equity transaction prompt as a visual equity transaction indicator on a display associated with the computing device. Equity transaction prompt providing module 216 may be configured to provide the equity transaction prompt as an equity transaction audio prompt. The equity transaction audio prompt may be provided via a speaker associated with computing platform(s) 202, or an audio output associated with remote platform(s) 204, for example at a smart speaker associated with the same authorized user as the user of computing platform(s) 202.

Transaction initiation prompt providing module 218 may be configured to, in response to a positive response to the equity transaction prompt, provide the computing device with a transaction initiation prompt to initiate conducting a related authenticated equity transaction based on one of the provided real-time equity quotes.

Transaction initiation prompt providing module 218 may be configured to, in response to a positive selection of the visual equity transaction indicator, provide a transaction initiation prompt on the display to initiate conducting a related authenticated equity transaction based on one of the provided real-time equity quotes. Computing platform(s) 202 may also be configured to conduct the related authenticated equity transaction, and in an embodiment to complete the transaction.

Transaction initiation prompt providing module 218 may be configured to, in response to a positive audio response to the equity transaction audio prompt, provide a transaction initiation audio prompt via a speaker associated with the computing device to initiate conducting a related authenticated equity transaction based on one of the provided real-time equity quotes.

Equity transaction generating module 220 may be configured to generate, using intelligent deep linking, pre-populated transaction details for conducting the related authenticated equity transaction on the computing device using a local platform or on a remote device using a remote platform. This is in contrast to known approaches that only provide deep linking with respect to the local platform. In an embodiment, information is determined and provided so that the transaction, or data transfer, may be completed either locally or remotely.

Transaction detail generating module 222 may be configured to, in response to a determination that the computing device is configured to conduct the related authenticated equity transaction, generate a local set of pre-populated transaction details for completing the related authenticated equity transaction on the computing device.

Transaction detail generating module 222 may be configured to generate a remote set of pre-populated transaction details for conducting the related authenticated equity transaction on the remote device.

Device identifying module 224 may be configured to identify a remote device configured to conduct the related equity transaction and on which a user associated with the computing device is known to have been previously authenticated. For example, the remote device may be a computer or smart speaker associated with the same authorized user as the user of the computing device or computing platform(s) 202.

Transaction detail providing module 226 may be configured to provide the remote set of pre-populated transaction details to the remote device.

Display module 228 may be configured to display, at a display associated with the computing device, a visual representation associated with the one or more real-time equity quotes. The visual representation may include one or more of: an indication of the source of the equity, an equity name and/or ticker symbol, a real-time equity price, an indication of the increase or decrease with respect to a previous value, an indication of the last update, and a bid price and an ask price with associated lot sizes and optional increase/decrease with respect to a corresponding previous value. Other implementations may include more or fewer displayed items or features.

Summary providing module 230 may be configured to provide, via a speaker associated with the computing device, an audio summary of the one or more real-time equity quotes. The audio summary may include one or more of: an indication of the source of the equity, an equity name and/or ticker symbol, a real-time equity price, an indication of the increase or decrease with respect to a previous value, an indication of the last update, and a bid price and an ask price with associated lot sizes and optional increase/decrease with respect to a corresponding previous value. Other implementations may include more or fewer displayed items or features.

In some embodiments, computing platform(s) 202, remote platform(s) 204, and/or external resources 232 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 232 may be operatively linked via some other communication media.

A given remote platform 204 may include one or more processors configured to execute computer program modules. The computer program modules may be configured to enable an expert or user associated with the given remote platform 204 to interface with system 200 and/or external resources 232, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 232 may include sources of information outside of system 200, external entities participating with system 200, and/or other resources. In some embodiments, some or all of the functionality attributed herein to external resources 232 may be provided by resources included in system 200.

Computing platform(s) 202 may include electronic storage 234, one or more processors 236, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 234 may comprise non-transitory storage media that electronically stores information. The electronic storage media of electronic storage 234 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 234 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 234 may include one or more virtual storage resources (e.g., cloud storage, a virtual private network, and/or other virtual storage resources). Electronic storage 234 may store software algorithms, information determined by processor(s) 236, information received from computing platform(s) 202, information received from remote platform(s) 204, and/or other information that enables computing platform(s) 202 to function as described herein.

Processor(s) 236 may be configured to provide information processing capabilities in computing platform(s) 202. As such, processor(s) 236 may include one or more of a digital processor, an analog processor, a digital circuit designed to process information, an analog circuit designed to process information, a state machine, and/or other mechanisms for electronically processing information. Although processor(s) 236 is shown in FIG. 2 as a single entity, this is for illustrative purposes only. In some embodiments, processor(s) 236 may include a plurality of processing units. These processing units may be physically located within the same device, or processor(s) 236 may represent processing functionality of a plurality of devices operating in coordination. Processor(s) 236 may be configured to execute modules 208, 210, 212, 214, 216, 218, 220, 222, 224, 226, 228 and/or 230, and/or other modules. Processor(s) 236 may be configured to execute modules 208, 210, 212, 214, 216, 218, 220, 222, 224, 226, 228 and/or 230, and/or other modules by software; hardware; firmware; some combination of software, hardware, and/or firmware; and/or other mechanisms for configuring processing capabilities on processor(s) 236. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, 228, 230, and/or 230 are illustrated in FIG. 2 as being implemented within a single processing unit, in embodiments in which processor(s) 236 includes multiple processing units, one or more of modules 208, 210, 212, 214, 216, 218, 220, 222, 224, 226, 228 and/or 230 may be implemented remotely from the other modules. The description of the functionality provided by the different modules 208, 210, 212, 214, 216, 218, 220, 222, 224, 226, 228 and/or 230 described below is for illustrative purposes, and is not intended to be limiting, as any of modules 208, 210, 212, 214, 216, 218, 220, 222, 224, 226, 228 and/or 230 may provide more or less functionality than is described. For example, one or more of modules 208, 210, 212, 214, 216, 218, 220, 222, 224, 226, 228 and/or 230 may be eliminated, and some or all of its functionality may be provided by other ones of modules 208, 210, 212, 214, 216, 218, 220, 222, 224, 226, 228 and/or 230. As another example, processor(s) 236 may be configured to execute one or more additional modules that may perform some or all of the functionality attributed below to one of modules 208, 210, 212, 214, 216, 218, 220, 222, 224, 226, 228 and/or 230.

Figure 3:
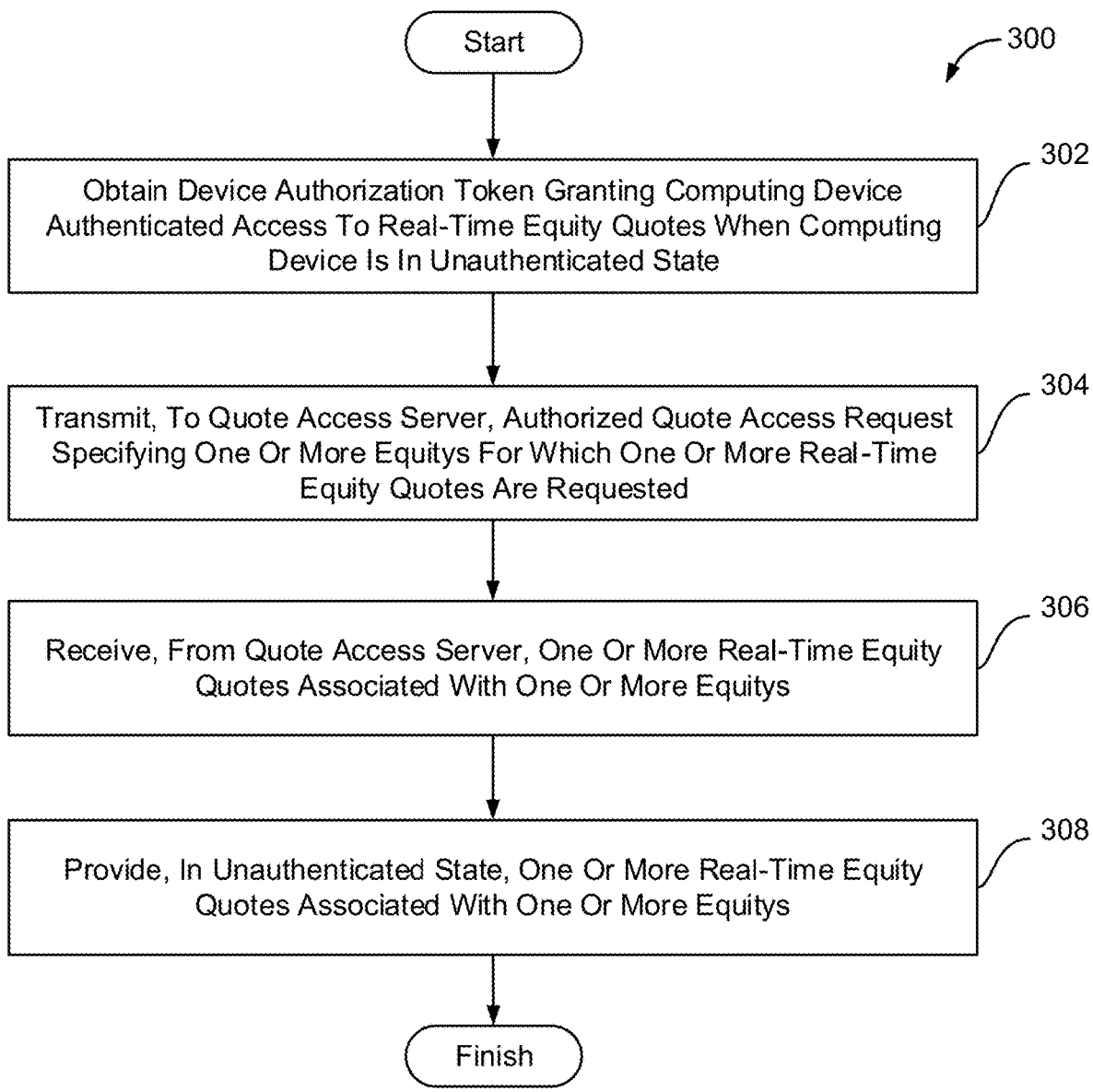
FIG. 3 illustrates a method for providing data access, in accordance with one or more embodiments.

FIG. 3 illustrates a method 300 for providing data access, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining a device authorization token granting a computing device authenticated access to real-time equity quotes when the computing device is in an unauthenticated state. Operation 302 may be performed by one or more hardware processors configured by machine-readable instructions including a module that is the same as or similar to device authorization obtaining module 208, in accordance with one or more embodiments.

An operation 304 may include transmitting, to a quote access server, an authorized quote access request specifying one or more equities for which one or more real-time equity quotes are requested. The authorized quote access request may include data associated with the device authorization token. Operation 304 may be performed by one or more hardware processors configured by machine-readable instructions including a module that is the same as or similar to quote access request transmittal module 210, in accordance with one or more embodiments.

An operation 306 may include receiving, from the quote access server, the one or more real-time equity quotes associated with the one or more equities. Operation 306 may be performed by one or more hardware processors configured by machine-readable instructions including a module that is the same as or similar to equity quote receiving module 212, in accordance with one or more embodiments.

An operation 308 may include providing, in the unauthenticated state, the one or more real-time equity quotes associated with the one or more equities. Operation 308 may be performed by one or more hardware processors configured by machine-readable instructions including a module that is the same as or similar to equity quote providing module 214, in accordance with one or more embodiments.

Figure 4:
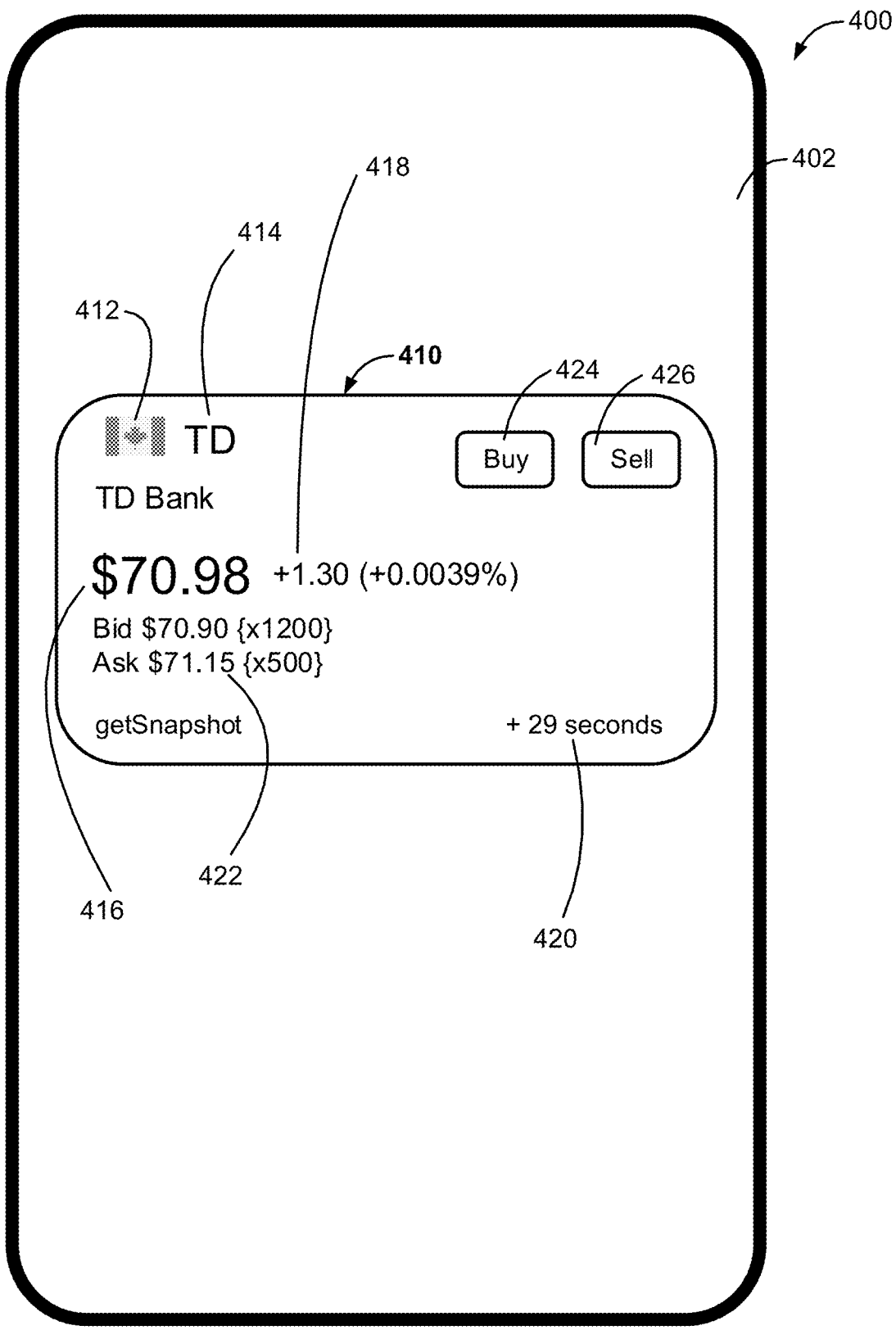
FIG. 4 illustrates a display output from a system or method for providing data access, in accordance with one or more embodiments.

FIG. 4 illustrates a display output 400 from a system or method for providing data access, in accordance with one or more embodiments. FIG. 4 is an example illustration of a widget 410 according to an embodiment of the present disclosure for providing unauthenticated access to real-time equity quotes to an authorized user. The example of FIG. 4 is shown on a display 402 of a mobile device, such as a smartphone. The user interface or display provided by the widget 410 includes a real-time equity quote that includes one or more elements. An indication of the source of the equity 412, such as a stock exchange or country, is shown in FIG. 4 as a Canadian flag representing the Toronto Stock Exchange. An equity name and/or ticker symbol 414 is shown in FIG. 4 as TD for the ticker symbol and TD Bank for the equity name.

A real-time equity price 416 is shown in FIG. 4 as $70.98. An indication 418 of the increase or decrease with respect to a previous value is shown in FIG. 4 as +1.30, or +0.0039%. In an example embodiment, the indication of the increase or decrease may include a different visual indicator based on the state, for example providing green text for an increase and red text for a decrease, or any other type of differential visual indicator, whether graphical or textual or both. An indication of the last update 420 is shown in FIG. 4 as +29 seconds, indicating that the last update was 29 seconds ago.

The example display in FIG. 4 also shows a bid price and an ask price 422, as well as a bid and ask size, or lot size, and optionally a change with respect to a corresponding previous value. In the example of FIG. 4, the bid price is shown as $70.90 with a bid size of 1200, and the ask price is shown as $71.15 with an ask size of 500. Similar to the indication 418 with respect to the equity price, an indication (not shown in FIG. 4) may be provided to represent the increase or decrease with respect to the previous value, in terms of the number difference, or as a percentage, or both. Other implementations may include more or fewer displayed items or features.

In the example of FIG. 4, the real-time quote is shown as being 29 seconds old, providing an indication of the advantage or benefit compared to the delayed quotes that are typically about 15 minutes old. This is an example implementation showing that a real-time quote is more frequently updated than a delayed quote, but need not be updated every second or every few seconds. For example, the real-time quote may be updated about every 10 seconds, about every 20 seconds, or about every 30 seconds, or even about every minute. Embodiments of the present disclosure operate with respect to substantially real-time equity quotes that provide a balance between near-real-time updates and the processing and communication overhead associated with more frequent updates.

A system and method according to an embodiment of the present disclosure may be configured to modify the frequency or speed of updating a real-time equity quote based on one or more of: processing power at a computing device, available memory at the computing device, communication link speed between the computing device and the quote access server, and communication link speed between the quote access server and the real-time quote server. In other embodiments, other factors may contribute to the frequency or speed of updating the real-time equity quote, including costs associated with more frequent updates, available service levels, and other factors.

The example display output of FIG. 4 also shows a "Buy" button 424 and a "Sell" button 426, enabling a user to initiate an equity transaction relating to the equity for which the real-time quote is being provided. In an example implementation, the selection of one of these buttons 424, 426 may activate the intelligent deep linking as described in further detail herein.

While the widget of FIG. 4 is shown on a smartphone display 402, the widget may be provided on a display of a tablet or other mobile device, including a wearable device such as a smart watch. In another implementation, instead of, or in addition, to a display output on a mobile device, embodiments of the present disclosure provide an audio output on a smart speaker, for example announcing the requested real-time equity quote in response to a user's audio request for the quotes. In an embodiment, the display output or audio output may be concurrently provided, in either the same or different formats, at a mobile device and at a remote device associated with the same user as the mobile device.

As described above, a widget 410 as shown in FIG. 4 can make it simpler and easier to view real-time quotes with a single swipe/gesture without opening an institution's app(s)

or logging in to an institution's website. In an embodiment, the widget determines whether a user is authorized to receive real-time quotes. In an embodiment, the quote goes through an institution's systems as if the user is logged in to the mobile platform, and the quote is provided in real-time, or substantially in real time, as described herein. The authorization may be based on the user having a direct investing account, since the institution typically pays for access to real-time quotes through trading brokers. Real-time data helps to reduce volatility, to make smart decisions based on what is happening right now, not 15 minutes ago.

Delayed stock quotes in known stock widgets are pulled via an API to access the quote data. For example, when an item is updated on Server A, and the API pulls data, there is no way to check if that data is stale. In contrast, embodiments of the present disclosure perform a "push" from an institution server, such as quote access and transaction server 120 in FIG. 1, to the computing device or mobile device, so that the quote is updated substantially in real-time. In an embodiment, the widget 410 pulls information and calls on Server A at a regular interval, for example every 10 seconds, and also has the ability to receive pushed information from Server A when the information gets refreshed. In an example embodiment, this is accomplished by the widget using a Server B that is in communication with Server A, and between which there is bidirectional communication. In an example implementation, Server A may be provided as quote access and transaction server 120, and Server B may be provided as real-time quote server 130, as shown in FIG. 1.

In an example embodiment of the present disclosure, the real-time quote data still goes through the institution's systems. Because the quote data is not sensitive or unique to the user, in an embodiment the widget only needs an indication that the user is a customer, or is otherwise authorized to receive the data, for example based on the access token 112 described in relation to FIG. 1. The user need not be actively logged in, but only provide an indication, for example, that they are a customer of the institution (and, for example, a direct investing client), and that the user has installed or opened the institution's mobile app at least once.

In an embodiment, the widget 410 provides information that does not require full login or authentication, but still requires that the user is entitled or authorized to obtain the real-time quote data. In an example implementation, the mobile device stores a token or some other indicator that indicates whether the user is authorized to obtain real-time quote data. In response to detection of presence of the token, the widget provides unauthenticated quotes or authorizes the mobile device to access or interact with the real-time quotes engine. In an implementation, the widget uses OAuth as an authentication method. In another implementation, another passwordless system is used.

Figure 5:
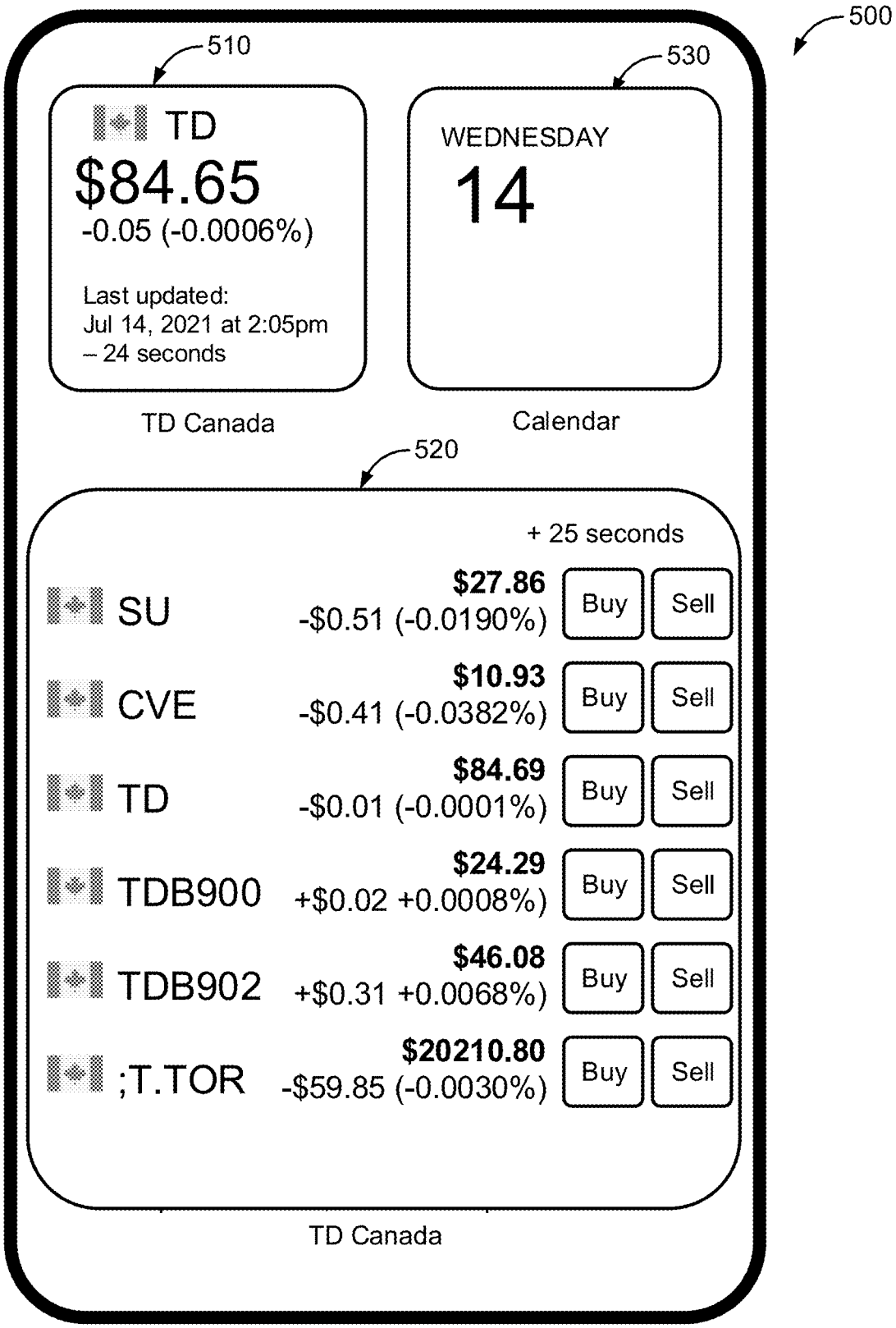
FIG. 5 illustrates another display output from a system or method for providing data access, in accordance with one or more embodiments.

FIG. 5 illustrates another display output 500 from a system or method for providing data access, in accordance with one or more embodiments. FIG. 5 is another example screenshot showing two widgets 510 and 520 according to an embodiment of the present disclosure for providing unauthenticated real-time equity quotes to an authorized user. These widgets are shown along with an example of a known calendar widget 530.

In FIG. 5, two separate widgets 510 and 520 are shown. A first widget 510 in the top left of the display comprises a real-time quote, an indication of the change, and the ticker symbol. The first widget 510 is small in real-estate and shows a real-time quote for a single equity, without a buy/sell button.

A second widget 520 is shown in the middle portion of FIG. 5 and takes up a majority of the widget display area in the illustrated embodiment. The second widget 520 provides real-time quotes for a plurality of equities, and shows an indication of the source of the equity (stock exchange or country), the ticker symbol, the real-time equity price, and an indication of the increase or decrease with respect to a previous value. In an example embodiment, the indication of the increase or decrease may include a different visual indicator based on the state, for example providing green text for an increase and red text for a decrease, or any other type of graphical and/or textual differential visual indicator. The second widget 520 also shows an indication of the last update with respect to the collective set of real-time equity prices, for example in a relative sense (near the top right, indicating 25 seconds from the last update), and an absolute sense (indicating the date and time of the last update).

In another embodiment, a different type of widget may be provided, which includes a subset of the features of the second widget 520, and more features than the first widget 510. In a further embodiment, a prompt or user interface is provided for a user to select the features to be included or omitted in one or more of the widgets provided in accordance with embodiments of the present disclosure. The widget is also configured to receive user input at the prompt or user interface and to modify the displayed features based on the user input.

In another aspect, a system or method according to an embodiment of the present disclosure provides a widget that enables intelligent deep linking. The intelligent deep linking enables a user to conduct a related equity transaction or trade, on the same computing device or on another platform, based on one of the displayed real-time quotes. For example, the widget can start with the user in an unauthenticated state, and present a set of real-time equity quotes to the user on a mobile device display, including equity transaction options such as "Buy" or "Sell" for the quoted equities.

In response to the user clicking on an equity transaction indicator, in an embodiment the widget provides intelligent deep linking to prompt and enable the user to perform actionable trades. For example, in response to a user clicking on a "Buy" button, the widget may use deep linking to bring the user directly to the transaction page in a financial institution's investing application, with some of the information pre-populated based on the selection and based on the displayed real-time equity quote.

Traditional deep linking is a uniform resource identifier (URI) in the form of: tdbank://location. Intelligent deep linking according to embodiments of the present disclosure may link to the same device that is running the widget, or may link to any other associated remote device, for example a desktop computer on which the user has recently logged in. In another embodiment, the intelligent deep linking is used to deep link starting from any platform, not just starting from a widget as described above.

In an example implementation, the deep linking is from a device server to a device. For example, a user can ask a voice assistant (such as Alexa) logged in to a financial institution platform for a stock price in real-time. The user can then ask the voice assistant to "sell" the quoted equity. The app or widget may determine whether the device on which the app or widget is currently running is able to perform the "sell" action, or any other requested action, data transfer or transaction. Even though that "sell" functionality may not be available on the computing device running the widget, the deep linking function can find or determine the previous device, or another device, on which the user logged in that has such functionality, and create and optionally automatically send a deep link for the transaction on such a device. For example, the server can retrieve device information, and recycle the device information by identifying devices that are recently logged in.

In one embodiment, the intelligent deep linking comprises deep linking from a widget to a mobile app. In another embodiment the intelligent deep linking comprises deep linking from a first unauthenticated platform to a second authenticated platform, or even from a first authenticated platform to a second authenticated platform.

For the intelligent deep linking, data may be sent to the server to create computations. For example, the user may perform an action, and the server may perform a computation of whether the next action will be performed by the same device or a different device. The deep linking functionality may be multi-platform; for example, if an action does not exist in the mobile app, or cannot be properly or fully performed using the mobile app, the server can redirect the user to a desktop app where it is known that the user has logged in and where such action can be performed.

Embodiments of the present disclosure may deep link to any institution platform, such as a financial institution or bank platform, to complete the transaction through the widget. Such functionality may be performed whether the transaction is completed through another channel, or on another platform.

In an example implementation, clicking on a buy/sell button in the widget may result in initiation of the following: launching the app and any associated authentication, for example using biometrics; pre-populating the connect ID; and landing the user on the trade page with some of the data pre-populated. In an example implementation, the widget logs the user in to the device on which the trade may be performed, and can bring the user to an appropriate account, for example a direct trading account.

When the user is a customer of a financial institution, the buy/sell button presented in the widget may have an option of a "one-buy" button, similar to "one-click" for purchases, taking into account any applicable regulations. For a non-customer, the widget may present a different option, for example if the user has to go through the adoption process (download app, enroll) to conduct a transaction, even though they had authorization to receive the real-time quotes.

In known approaches, deep linking is typically localized. For example, a website that opens after clicking on a link (e.g. e-transfer), presents an option to open a financial institution app, for example verifying locally in the device whether the financial institution app exists. According to embodiments of the present disclosure, when the user taps on the link, instead of only checking locally on the device (which it can do), the widget also performs steps on a remote device, such as a cloud server. The remote device, or cloud server, may comprise or be in communication with a memory storing applicable rules/policies for that specific user, not just checking locally if the app exists on that mobile device or computing device, but checking whether this specific user is able to open that app in general, or perform the requested action on a platform on which the user has an account or has access to perform the action, such as a buy/sell transaction.

Embodiments of the present disclosure introduce a level of intelligence to the deep linking. In an example embodiment, the intelligent deep linking comprises checking the cloud for more rules that apply to this user, to determine whether the deep link should direct to the mobile app or to another platform, and allows personalization. In an embodiment, data transfer or transaction details are determined for both local execution and remote execution. According to other embodiments, the intelligent deep linking may include one or more of: checking for user policies/rules/authorization, locally or in the cloud, or both; and checking if there is a transaction warning flag, such as a recent SEC (Securities and Exchange Commission) violation, or some other flag to prevent the transaction from proceeding.

Embodiments of the present disclosure may transmit, along with the payload of the deep link, an identification of the equity that the user is transacting on. In an example implementation, this process can start from an unauthenticated platform, and then move to an authenticated platform, using a widget.

In an embodiment, the intelligent deep linking is provided in conjunction with a system or method such as the systems and methods described in relation to any one of FIGS. 1-5.

In another embodiment, the intelligent deep linking is provided in conjunction with a system or method independent of any of the systems and methods described in relation to any one of FIGS. 1-5. For example, the intelligent deep linking need not be provided in the context of a real-time equity quote request that results in enabling an associated transaction. In an embodiment, the intelligent deep linking may be provided as a means of transferring data from a first platform to a second platform, for example starting from an unauthenticated platform, and then moving to an authenticated platform, such as using a widget. In other embodiments, the intelligent deep linking may be provided as a means of transferring data from a first platform to a second platform, for example from a first authenticated platform to a second authenticated platform, or from a first unauthenticated platform to a second unauthenticated platform, or from an authenticated platform to an unauthenticated platform.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out in the dependent clauses.

One aspect of the present disclosure relates to a system configured for providing data access. The system may include one or more hardware processors configured by machine-readable instructions. The processor(s) may be configured to obtain a device authorization token granting a computing device authenticated access to real-time equity quotes when the computing device is in an unauthenticated state. The processor(s) may be configured to transmit, to a quote access server, an authorized quote access request specifying one or more equities for which one or more real-time equity quotes are requested. The authorized quote access request may include data associated with the device authorization token. The processor(s) may be configured to receive, from the quote access server, the one or more real-time equity quotes associated with the one or more equities. The processor(s) may be configured to provide, in the unauthenticated state, the one or more real-time equity quotes associated with the one or more equities.

In some implementations of the system, the processor(s) may be configured to obtain the device authorization token based on an indication that the computing device is associated with a customer of an institution. In some implementations of the system, based on an indication that the may computing device is associated with a non-customer authorized to receive the one or more real-time equity quotes from the institution.

In some implementations of the system, the processor(s) may be configured to provide an equity transaction prompt. In some implementations of the system, the processor(s) may be configured to, in response to a positive response to the equity transaction prompt, provide the computing device with a transaction completion prompt to initiate conducting a related authenticated equity transaction based on one of the provided real-time equity quotes.

In some implementations of the system, the processor(s) may be configured to generate, using intelligent deep linking, pre-populated transaction details for conducting the related authenticated equity transaction on the computing device using a local platform or on a remote device using a remote platform.

In some implementations of the system, the processor(s) may be configured to, in response to a determination that the computing device is configured to conduct the related authenticated equity transaction, generate a local set of pre-populated transaction details for completing the related authenticated equity transaction on the computing device.

In some implementations of the system, the processor(s) may be configured to identify a remote device configured to conduct the related equity transaction and on which a user associated with the computing device is known to have been previously authenticated. In some implementations of the system, the processor(s) may be configured to generate a remote set of pre-populated transaction details for conducting the related authenticated equity transaction on the remote device. In some implementations of the system, the processor(s) may be configured to provide the remote set of pre-populated transaction details to the remote device.

In some implementations of the system, the processor(s) may be configured to display, at a display associated with the computing device, a visual representation associated with the one or more real-time equity quotes.

In some implementations of the system, the processor(s) may be configured to provide the equity transaction prompt as a visual equity transaction indicator on a display associated with the computing device. In some implementations of the system, the processor(s) may be configured to, in response to a positive selection of the visual equity transaction indicator, provide a transaction completion prompt on the display to initiate conducting a related authenticated equity transaction based on one of the provided real-time equity quotes.

In some implementations of the system, the processor(s) may be configured to provide, via a speaker associated with the computing device, an audio summary of the one or more real-time equity quotes.

In some implementations of the system, the processor(s) may be configured to provide the equity transaction prompt as an equity transaction audio prompt. In some implementations of the system, the processor(s) may be configured to, in response to a positive audio response to the equity transaction audio prompt, provide a transaction completion audio prompt via a speaker associated with the computing device to initiate conducting a related authenticated equity transaction based on one of the provided real-time equity quotes.

Another aspect of the present disclosure relates to a method for providing data access. The method may include obtaining a device authorization token granting a computing device authenticated access to real-time equity quotes when the computing device is in an unauthenticated state. The method may include transmitting, to a quote access server, an authorized quote access request specifying one or more equities for which one or more real-time equity quotes are requested. The authorized quote access request may include data associated with the device authorization token. The method may include receiving, from the quote access server, the one or more real-time equity quotes associated with the one or more equities. The method may include providing, in the unauthenticated state, the one or more real-time equity quotes associated with the one or more equities.

In some implementations of the method, it may include obtaining the device authorization token based on an indication that the computing device is associated with a customer of an institution. In some implementations of the method, based on an indication that the may computing device is associated with a non-customer authorized to receive the one or more real-time equity quotes from the institution.

In some implementations of the method, it may include providing an equity transaction prompt. In some implementations of the method, it may include, in response to a positive response to the equity transaction prompt, providing the computing device with a transaction completion prompt to initiate conducting a related authenticated equity transaction based on one of the provided real-time equity quotes.

In some implementations of the method, it may include generating, using intelligent deep linking, pre-populated transaction details for conducting the related authenticated equity transaction on the computing device using a local platform or on a remote device using a remote platform.

In some implementations of the method, it may include, in response to a determination that the computing device is configured to conduct the related authenticated equity transaction, generating a local set of pre-populated transaction details for completing the related authenticated equity transaction on the computing device.

In some implementations of the method, it may include identifying a remote device configured to conduct the related equity transaction and on which a user associated with the computing device is known to have been previously authenticated. In some implementations of the method, it may include generating a remote set of pre-populated transaction details for conducting the related authenticated equity transaction on the remote device. In some implementations of the method, it may include providing the remote set of pre-populated transaction details to the remote device.

In some implementations of the method, it may include displaying, at a display associated with the computing device, a visual representation associated with the one or more real-time equity quotes.

In some implementations of the method, it may include providing the equity transaction prompt as a visual equity transaction indicator on a display associated with the computing device. In some implementations of the method, it may include, in response to a positive selection of the visual equity transaction indicator, providing a transaction completion prompt on the display to initiate conducting a related authenticated equity transaction based on one of the provided real-time equity quotes.

In some implementations of the method, it may include providing, via a speaker associated with the computing device, an audio summary of the one or more real-time equity quotes.

In some implementations of the method, it may include providing the equity transaction prompt as an equity transaction audio prompt. In some implementations of the method, it may include, in response to a positive audio response to the equity transaction audio prompt, providing a transaction completion audio prompt via a speaker associated with the computing device to initiate conducting a related authenticated equity transaction based on one of the provided real-time equity quotes.

Yet another aspect of the present disclosure relates to a non-transient computer-readable storage medium having instructions embodied thereon, the instructions being executable by one or more processors to perform a method for providing data access. The method may include obtaining a device authorization token granting a computing device authenticated access to real-time equity quotes when the computing device is in an unauthenticated state. The method may include transmitting, to a quote access server, an authorized quote access request specifying one or more equities for which one or more real-time equity quotes are requested. The authorized quote access request may include data associated with the device authorization token. The method may include receiving, from the quote access server, the one or more real-time equity quotes associated with the one or more equities. The method may include providing, in the unauthenticated state, the one or more real-time equity quotes associated with the one or more equities.

In some implementations of the computer-readable storage medium, the method may include obtaining the device authorization token based on an indication that the computing device is associated with a customer of an institution. In some implementations of the computer-readable storage medium, based on an indication that the may computing device is associated with a non-customer authorized to receive the one or more real-time equity quotes from the institution.

In some implementations of the computer-readable storage medium, the method may include providing an equity transaction prompt. In some implementations of the computer-readable storage medium, the method may include, in response to a positive response to the equity transaction prompt, providing the computing device with a transaction completion prompt to initiate conducting a related authenticated equity transaction based on one of the provided real-time equity quotes.

In some implementations of the computer-readable storage medium, the method may include generating, using intelligent deep linking, pre-populated transaction details for conducting the related authenticated equity transaction on the computing device using a local platform or on a remote device using a remote platform.

In some implementations of the computer-readable storage medium, the method may include, in response to a determination that the computing device is configured to conduct the related authenticated equity transaction, generating a local set of pre-populated transaction details for completing the related authenticated equity transaction on the computing device.

In some implementations of the computer-readable storage medium, the method may include identifying a remote device configured to conduct the related equity transaction and on which a user associated with the computing device is known to have been previously authenticated. In some implementations of the computer-readable storage medium, the method may include generating a remote set of pre-populated transaction details for conducting the related authenticated equity transaction on the remote device. In some implementations of the computer-readable storage medium, the method may include providing the remote set of pre-populated transaction details to the remote device.

In some implementations of the computer-readable storage medium, the method may include displaying, at a display associated with the computing device, a visual representation associated with the one or more real-time equity quotes.

In some implementations of the computer-readable storage medium, the method may include providing the equity transaction prompt as a visual equity transaction indicator on a display associated with the computing device. In some implementations of the computer-readable storage medium, the method may include, in response to a positive selection of the visual equity transaction indicator, providing a transaction completion prompt on the display to initiate conducting a related authenticated equity transaction based on one of the provided real-time equity quotes.

In some implementations of the computer-readable storage medium, the method may include providing, via a speaker associated with the computing device, an audio summary of the one or more real-time equity quotes.

In some implementations of the computer-readable storage medium, the method may include providing the equity transaction prompt as an equity transaction audio prompt. In some implementations of the computer-readable storage medium, the method may include, in response to a positive audio response to the equity transaction audio prompt, providing a transaction completion audio prompt via a speaker associated with the computing device to initiate conducting a related authenticated equity transaction based on one of the provided real-time equity quotes.

Still another aspect of the present disclosure relates to a system configured for providing data access. The system may include means for obtaining a device authorization token granting a computing device authenticated access to real-time equity quotes when the computing device is in an unauthenticated state. The system may include means for transmitting, to a quote access server, an authorized quote access request specifying one or more equities for which one or more real-time equity quotes are requested. The authorized quote access request may include data associated with the device authorization token. The system may include means for receiving, from the quote access server, the one or more real-time equity quotes associated with the one or more equities. The system may include means for providing, in the unauthenticated state, the one or more real-time equity quotes associated with the one or more equities.

In some implementations of the system, the system may include means for obtaining the device authorization token based on an indication that the computing device is associated with a customer of an institution. In some implementations of the system, based on an indication that the may computing device is associated with a non-customer authorized to receive the one or more real-time equity quotes from the institution.

In some implementations of the system, the system may include means for providing an equity transaction prompt. In some implementations of the system, the system may include means for, in response to a positive response to the equity transaction prompt, providing the computing device with a transaction completion prompt to initiate conducting a related authenticated equity transaction based on one of the provided real-time equity quotes.

In some implementations of the system, the system may include means for generating, using intelligent deep linking, pre-populated transaction details for conducting the related authenticated equity transaction on the computing device using a local platform or on a remote device using a remote platform.

In some implementations of the system, the system may include means for, in response to a determination that the computing device is configured to conduct the related authenticated equity transaction, generating a local set of pre-populated transaction details for completing the related authenticated equity transaction on the computing device.

In some implementations of the system, the system may include means for identifying a remote device configured to conduct the related equity transaction and on which a user associated with the computing device is known to have been previously authenticated. In some implementations of the system, the system may include means for generating a remote set of pre-populated transaction details for conducting the related authenticated equity transaction on the remote device. In some implementations of the system, the system may include means for providing the remote set of pre-populated transaction details to the remote device.

In some implementations of the system, the system may include means for displaying, at a display associated with the computing device, a visual representation associated with the one or more real-time equity quotes.

In some implementations of the system, the system may include means for providing the equity transaction prompt as a visual equity transaction indicator on a display associated with the computing device. In some implementations of the system, the system may include means for, in response to a positive selection of the visual equity transaction indicator, providing a transaction completion prompt on the display to initiate conducting a related authenticated equity transaction based on one of the provided real-time equity quotes.

In some implementations of the system, the system may include means for providing, via a speaker associated with the computing device, an audio summary of the one or more real-time equity quotes.

In some implementations of the system, the system may include means for providing the equity transaction prompt as an equity transaction audio prompt. In some implementations of the system, the system may include means for, in response to a positive audio response to the equity transaction audio prompt, providing a transaction completion audio prompt via a speaker associated with the computing device to initiate conducting a related authenticated equity transaction based on one of the provided real-time equity quotes.

Even another aspect of the present disclosure relates to a computing platform configured for providing data access. The computing platform may include a non-transient computer-readable storage medium having executable instructions embodied thereon. The computing platform may include one or more hardware processors configured to execute the instructions. The processor(s) may execute the instructions to obtain a device authorization token granting a computing device authenticated access to real-time equity quotes when the computing device is in an unauthenticated state. The processor(s) may execute the instructions to transmit, to a quote access server, an authorized quote access request specifying one or more equities for which one or more real-time equity quotes are requested. The authorized quote access request may include data associated with the device authorization token. The processor(s) may execute the instructions to receive, from the quote access server, the one or more real-time equity quotes associated with the one or more equities. The processor(s) may execute the instructions to provide, in the unauthenticated state, the one or more real-time equity quotes associated with the one or more equities.

In some implementations of the computing platform, the processor(s) may execute the instructions to obtain the device authorization token based on an indication that the computing device is associated with a customer of an institution. In some implementations of the computing platform, based on an indication that the may computing device is associated with a non-customer authorized to receive the one or more real-time equity quotes from the institution.

In some implementations of the computing platform, the processor(s) may execute the instructions to provide an equity transaction prompt. In some implementations of the computing platform, the processor(s) may execute the instructions to, in response to a positive response to the equity transaction prompt, provide the computing device with a transaction completion prompt to initiate conducting a related authenticated equity transaction based on one of the provided real-time equity quotes.

In some implementations of the computing platform, the processor(s) may execute the instructions to generate, using intelligent deep linking, pre-populated transaction details for conducting the related authenticated equity transaction on the computing device using a local platform or on a remote device using a remote platform.

In some implementations of the computing platform, the processor(s) may execute the instructions to, in response to a determination that the computing device is configured to conduct the related authenticated equity transaction, generate a local set of pre-populated transaction details for completing the related authenticated equity transaction on the computing device.

In some implementations of the computing platform, the processor(s) may execute the instructions to identify a remote device configured to conduct the related equity transaction and on which a user associated with the computing device is known to have been previously authenticated. In some implementations of the computing platform, the processor(s) may execute the instructions to generate a remote set of pre-populated transaction details for conducting the related authenticated equity transaction on the remote device. In some implementations of the computing platform, the processor(s) may execute the instructions to provide the remote set of pre-populated transaction details to the remote device.

In some implementations of the computing platform, the processor(s) may execute the instructions to display, at a display associated with the computing device, a visual representation associated with the one or more real-time equity quotes.

In some implementations of the computing platform, the processor(s) may execute the instructions to provide the equity transaction prompt as a visual equity transaction indicator on a display associated with the computing device. In some implementations of the computing platform, the processor(s) may execute the instructions to, in response to a positive selection of the visual equity transaction indicator, provide a transaction completion prompt on the display to initiate conducting a related authenticated equity transaction based on one of the provided real-time equity quotes.

In some implementations of the computing platform, the processor(s) may execute the instructions to provide, via a speaker associated with the computing device, an audio summary of the one or more real-time equity quotes.

In some implementations of the computing platform, the processor(s) may execute the instructions to provide the equity transaction prompt as an equity transaction audio prompt. In some implementations of the computing platform, the processor(s) may execute the instructions to, in response to a positive audio response to the equity transaction audio prompt, provide a transaction completion audio prompt via a speaker associated with the computing device to initiate conducting a related authenticated equity transaction based on one of the provided real-time equity quotes.

What is claimed is:

1. A computing device configured for providing access to restricted data, the computing device comprising:
    a non-transient computer-readable storage medium having executable instructions embodied thereon; and
    one or more hardware processors configured to execute the instructions to:
        obtain a device authorization token granting the computing device authenticated access to real-time restricted data when the computing device is in an unauthenticated state, wherein the real-time restricted data is the restricted data that, absent the device authorization token, can only be accessed by a computing device in an authenticated state;
        transmit, to a restricted data access server, an authorized restricted data access request specifying one or more real-time restricted data for which access is requested, the authorized restricted data access request comprising data associated with the device authorization token, the data associated with the device authorization token indicating that the computing device is authorized to receive the real-time restricted data;
        receive, from the restricted data access server, the one or more real-time restricted data associated with the authorized restricted data access request; and
        provide, in the unauthenticated state, the one or more real-time restricted data associated with the authorized restricted data access request.

2. The computing device of claim 1, wherein the one or more hardware processors are further configured by the instructions to:
    obtain the device authorization token based on an indication that the computing device is associated with a customer of an institution, or based on an indication that the computing device is associated with a non-customer authorized to receive the one or more real-time restricted data from the institution.

3. The computing device of claim 1, wherein the one or more hardware processors are further configured by the instructions to:
    provide a transaction prompt;
    in response to a positive response to the transaction prompt, provide the computing device with a transaction completion prompt to initiate conducting a related authenticated transaction based on one of the provided real-time restricted data.

4. The computing device of claim 3, wherein the one or more hardware processors are further configured by the instructions to:
    generate, using intelligent deep linking, pre-populated transaction details for conducting the related authenticated transaction on the computing device using a local platform or on a remote device using a remote platform.

5. The computing device of claim 4, wherein the one or more hardware processors are further configured by the instructions to:
    in response to a determination that the computing device is configured to conduct the related authenticated transaction, generate a local set of pre-populated transaction details for completing the related authenticated transaction on the computing device.

6. The computing device of claim 3, wherein the one or more hardware processors are further configured by the instructions to:
    provide the transaction prompt as a visual transaction indicator on a display associated with the computing device;
    in response to a positive selection of the visual transaction indicator, provide a transaction completion prompt on the display to initiate conducting a related authenticated transaction based on one of the provided real-time restricted data.

7. The computing device of claim 3, wherein the one or more hardware processors are further configured by the instructions to:
    provide the transaction prompt as a transaction audio prompt;
    in response to a positive audio response to the transaction audio prompt, provide a transaction completion audio prompt via a speaker associated with the computing device to initiate conducting a related authenticated transaction based on one of the provided real-time restricted data.

8. The computing device of claim 1, wherein the one or more hardware processors are further configured by the instructions to:
    identify a remote device configured to conduct the related transaction and on which a user associated with the computing device is known to have been previously authenticated;
    generate a remote set of pre-populated transaction details for conducting the related authenticated transaction on the remote device;
    provide the remote set of pre-populated transaction details to the remote device.

9. The computing device of claim 1, wherein the one or more hardware processors are further configured by the instructions to:

display, at a display associated with the computing device, a visual representation associated with the one or more real-time restricted data.

10. The computing device of claim 1, wherein the one or more hardware processors are further configured by the instructions to:
provide, via a speaker associated with the computing device, an audio summary of the one or more real-time restricted data.

11. A processor-implemented method of providing access to restricted data, the method comprising:
obtaining a device authorization token granting a computing device authenticated access to real-time restricted data when the computing device is in an unauthenticated state, wherein the real-time restricted data is the restricted data that, absent the device authorization token, can only be accessed by a computing device in an authenticated state;
transmitting, to a restricted data access server, an authorized restricted data access request specifying one or more real-time restricted data for which access is requested, the authorized restricted data access request comprising data associated with the device authorization token, the data associated with the device authorization token indicating that the computing device is authorized to receive the real-time restricted data;
receiving, from the restricted data access server, the one or more real-time restricted data associated with the authorized restricted data access request; and
providing, in the unauthenticated state, the one or more real-time restricted data associated with the authorized restricted data access request.

12. The method of claim 11, further comprising:
obtaining the device authorization token based on an indication that the computing device is associated with a customer of an institution, or based on an indication that the computing device is associated with a non-customer authorized to receive the one or more real-time restricted data from the institution.

13. The method of claim 11, further comprising:
providing an transaction prompt; and
in response to a positive response to the transaction prompt, providing the computing device with a transaction completion prompt to initiate conducting a related authenticated transaction based on one of the provided real-time restricted data.

14. The method of claim 13, further comprising:
generating, using intelligent deep linking, pre-populated transaction details for conducting the related authenticated transaction on the computing device using a local platform or on a remote device using a remote platform.

15. The method of claim 14, further comprising:
in response to a determination that the computing device is configured to conduct the related authenticated transaction, generating a local set of pre-populated transaction details for completing the related authenticated transaction on the computing device.

16. The method of claim 13, further comprising:
providing the transaction prompt as a visual transaction indicator on a display associated with the computing device; and
in response to a positive selection of the visual transaction indicator, providing a transaction completion prompt on the display to initiate conducting a related authenticated transaction based on one of the provided real-time restricted data.

17. The method of claim 11, further comprising:
identifying a remote device configured to conduct the related transaction and on which a user associated with the computing device is known to have been previously authenticated;
generating a remote set of pre-populated transaction details for conducting the related authenticated transaction on the remote device; and
providing the remote set of pre-populated transaction details to the remote device.

18. The method of claim 11, further comprising:
displaying, at a display associated with the computing device, a visual representation associated with the one or more real-time restricted data.

19. A non-transient computer-readable storage medium having instructions embodied thereon, the instructions being executable by one or more processors to perform a method for providing access to restricted data, the method comprising:
obtaining a device authorization token granting a computing device authenticated access to real-time restricted data when the computing device is in an unauthenticated state, wherein the real-time restricted data is the restricted data that, absent the device authorization token, can only be accessed by a computing device in an authenticated state;
transmitting, to a restricted data access server, an authorized restricted data access request specifying one or more real-time restricted data for which access is requested, the authorized restricted data access request comprising data associated with the device authorization token, the data associated with the device authorization token indicating that the computing device is authorized to receive the real-time restricted data;
receiving, from the restricted data access server, the one or more real-time restricted data associated with the authorized restricted data access request; and
providing, in the unauthenticated state, the one or more real-time restricted data associated with the authorized restricted data access request.

20. The computer-readable storage medium of claim 19, wherein the method further comprises:
generating, using intelligent deep linking, pre-populated transaction details for conducting the related authenticated transaction on the computing device using a local platform or on a remote device using a remote platform.

* * * * *